(12) United States Patent
Cai et al.

(10) Patent No.: US 9,959,021 B2
(45) Date of Patent: May 1, 2018

(54) METHOD, SYSTEM AND COMPUTER STORAGE MEDIUM OF CONTROLLING VISUAL FIELD BASED ON DISTANCES BETWEEN USERS AND A CURRENT USER

(71) Applicant: TENCENT TECHNOLOGY (SHENZHEN) COMPANY LIMITED, Shenzhen, Guangdong (CN)

(72) Inventors: Mingfu Cai, Shenzhen (CN); Xiaocheng Ding, Shenzhen (CN)

(73) Assignee: TENCENT TECHNOLOGY (SHENZHEN) COMPANY LIMITED, Shenzhen, Guangdong (CN)

( * ) Notice: Subject to any disclaimer, the term of this patent is extended or adjusted under 35 U.S.C. 154(b) by 514 days.

(21) Appl. No.: 14/566,425

(22) Filed: Dec. 10, 2014

(65) Prior Publication Data

US 2015/0095793 A1 Apr. 2, 2015

Related U.S. Application Data

(63) Continuation of application No. PCT/CN2013/077461, filed on Jun. 19, 2013.

(30) Foreign Application Priority Data

Jun. 25, 2012 (CN) .......................... 2012 1 0210449

(51) Int. Cl.
*G06F 17/30* (2006.01)
*G06F 15/16* (2006.01)
(Continued)

(52) U.S. Cl.
CPC ........ *G06F 3/04842* (2013.01); *G06F 3/0481* (2013.01); *H04W 4/023* (2013.01)

(58) Field of Classification Search
CPC .......... G06F 17/30; G06F 3/048; G06F 15/16; G06F 3/00
See application file for complete search history.

(56) References Cited

U.S. PATENT DOCUMENTS 5,596,500 A * 1/1997 Sprague ................. G01C 21/20
342/457
7,672,778 B1 * 3/2010 Elliott .................... G01C 21/32
701/102

(Continued)

FOREIGN PATENT DOCUMENTS

| CN | 101769744 A | 7/2010 |
| CN | 102098388 A | 6/2011 |

(Continued)

OTHER PUBLICATIONS

State Intellectual Property Office of the P. R. China "Office Action for CN201210210449.1", China, dated Jul. 7, 2014.

(Continued)

*Primary Examiner* — Hugo Molina
(74) *Attorney, Agent, or Firm* — Tim Tingkang Xia, Esq.; Locke Lord LLP (57) ABSTRACT

A map server includes a user list obtaining module configured to obtain a user list in a 3×3 grid; a distance queue generating module configured to obtain distances between users and a current user in the user list, and generate two distance queues corresponding to preset distance ranges according to the distances, the distance queue including users in the user list whose distances from the current user are in a corresponding distance range; a visual field list generating module configured to select users from the distance queue into a visual field list according to a weight corresponding to the distance queue. Further, a visual field controlling method and system, and a computer storage medium, may be used to classify users in the 3×3 grid into (Continued)

distance queues using distance ranges, and select users into the visual field list according to the weight, thereby reducing pressure of the server.

14 Claims, 4 Drawing Sheets

(51) Int. Cl.
 G06F 3/048 (2013.01)
 G06F 3/00 (2006.01)
 G06F 3/0484 (2013.01)
 H04W 4/02 (2018.01)
 G06F 3/0481 (2013.01)

(56) References Cited

U.S. PATENT DOCUMENTS

| | | | | |
|---|---|---|---|---|
| 8,713,004 | B1* | 4/2014 | Hands | G06F 17/3087 707/724 |
| 8,886,715 | B1* | 11/2014 | Zhu | H04L 67/2847 701/430 |
| 9,063,951 | B1* | 6/2015 | Zhu | G06F 17/30241 |
| 2008/0186164 | A1* | 8/2008 | Emigh | B60R 25/1004 340/539.13 |
| 2009/0132929 | A1* | 5/2009 | Reed, Jr. | G06F 17/3087 715/739 |
| 2011/0063319 | A1* | 3/2011 | Cho | G06F 17/30241 345/582 |
| 2011/0083111 | A1* | 4/2011 | Forutanpour | G06F 1/1694 715/863 |
| 2012/0066646 | A1* | 3/2012 | Purdy | G06Q 30/0251 715/834 |
| 2012/0072840 | A1* | 3/2012 | Koshi | G06F 3/0482 715/702 |
| 2012/0233557 | A1* | 9/2012 | Wakhlu | G06F 3/0481 715/753 |
| 2012/0249455 | A1* | 10/2012 | Nagata | G06F 3/0488 345/173 |
| 2013/0124563 | A1* | 5/2013 | CaveLie | G06F 17/30241 707/770 |
| 2013/0151645 | A1* | 6/2013 | Siliski | G06F 17/30902 709/213 |
| 2013/0331130 | A1* | 12/2013 | Lee | H04M 3/42348 455/457 |
| 2015/0186443 | A1* | 7/2015 | Ito | G06F 17/30241 707/618 |
| 2015/0189038 | A1* | 7/2015 | Nourse | H04L 67/2847 709/203 |

FOREIGN PATENT DOCUMENTS

| | | |
|---|---|---|
| WO | 2007108927 A2 | 9/2007 |
| WO | 2012024157 A2 | 2/2012 |

OTHER PUBLICATIONS

International Search Report issued by State Intellectual Property Office of the P. R. China dated Sep. 11, 2013 for Application No. PTC/CN2013/077461.

* cited by examiner

METHOD, SYSTEM AND COMPUTER STORAGE MEDIUM OF CONTROLLING VISUAL FIELD BASED ON DISTANCES BETWEEN USERS AND A CURRENT USER

CROSS-REFERENCE TO RELATED APPLICATIONS

The present application is a U.S. continuation application of International Application No. PCT/CN2013/077461, filed Jun. 19, 2013, which itself claims the priority to Chinese Application No. 201210210449.1, filed Jun. 25, 2012, which are incorporated herein by reference in their entireties.

FIELD OF THE INVENTION

The present invention relates to computer technique fields, more particularly, to a map server, a visual field controlling method and system, and a computer storage medium.

BACKGROUND OF THE INVENTION

In map-based applications, a scene range shown by a client where each user (usually using a subject to implement) locates is called a visual field of a user. For the map-based application, a visual field list corresponding to each user is generally maintained in a map server. The visual field list is a user list that the client where the user locates should show. For example, for a user A, the visual field list corresponding to the user A includes 10 other users. The client where the user A locates should show the 10 other users in the visual field list.

A location of the user in a map scene often changes. When data in the visual field list corresponding to the user change, users shown by the client where the user locates in the map scene change too, i.e., the visual field of the user changes.

When state information of one user changes, the map server obtains state change information of the user in real time, and broadcasts the state change information of the user to the clients where other users locate in the visual field list corresponding to the user.

In one map scene, each user in the map needs to inform other users in the scene his state change information. The change information is verified by the server, and the server broadcasts the change information to clients of other users. The map scenes in prior map-based applications are usually very large. If the visual field list corresponding to the user includes all other users in the map scene where the user locates, when broadcasting state change information of the user, the map server costs a lot of resources.

A relationship between a total amount of broadcast package of the server and number of user in the scene is an n×n relationship. The more number of user in the scene is, the more number of broadcast package is. Calculating with conditions of a change information package being generated per person per second and size of the change information package being 500 bytes and there being 2000 persons in the scene, if all users in the scene are informed of state change of all persons, it will generate data flow of 500×2000× 2000=2 GB/second=16 Gbps. This data flow is far beyond the endurance of a gigabit Ethernet card and meanwhile a CPU of the server is over endured.

A conventional way is to divide the map scene into a number of sub-grids. The server maintains those users on each sub-grid. A visual field list that a conventional map server maintains corresponding to a user includes users in a user-centered 3×3 grid range. The map server broadcasts state change information of the user to other users in the 3×3 grid range.

However, because users may crowd somewhere in the map scenes, the visual field list that the conventional map server maintains may still include a number of users in these map scenes. Therefore, when broadcasting state change information of the user, the conventional map server still costs a lot of resources. Broadcast pressure of the server is still large.

SUMMARY OF THE INVENTION

Accordingly, it is necessary to provide a map server, a visual field controlling method and system, and a computer storage medium capable of reducing broadcast pressure of the server efficiently.

A map server includes:
a user list obtaining module configured to obtain a current-user-centered user list in a 3×3 grid;
a distance queue generating module configured to obtain distances between users and a current user in the user list, and to generate at least two distance queues corresponding to preset distance ranges according to the distances, the distance queue including users in the user list whose distances from the current user are in a corresponding distance range;
a visual field list generating module configured to select a preset number of users from the distance queue into a visual field list according to a preset weight corresponding to the distance queue, where the closer the distance range corresponding to the distance queue from the current user is, the higher the weight corresponding to the distance queue is.

A visual field controlling system includes the map server and a client interacting with the map server.

A visual field controlling method includes the following steps:
obtaining a current-user-centered user list in a 3×3 grid;
obtaining distances between users and the current user in the user list, and generating at least two distance queues corresponding to preset distance ranges according to the distances, the distance queue including users in the user list whose distances from the current user are in a corresponding distance range;
selecting a preset number of users from the distance queue into a visual field list according to a preset weight corresponding to the distance queue, where the closer the distance range corresponding to the distance queue from the current user is, the higher the weight corresponding to the distance queue is.

A computer storage medium used to store computer-executable instructions, the computer-executable instructions used for implementing a visual field controlling method, where the method is the above visual field controlling method.

The map server, the visual field controlling method and system and the computer storage medium classifies the users in the 3×3 grid into a number of distance queues using the preset distance ranges, selects some users into the visual field list according to a different weight of each distance queue, thereby reducing the pressure of the server. At this time, the current user can see more users around and there are users existing at some farther place. Under the circumstance of a large number of users crowding, the scene can be more real and the user experience can be improved.

DETAILED DESCRIPTION OF THE EMBODIMENTS

In order to broadcast his state change information to users around, one user firstly needs to do a visual field search to obtain a list of the users around. It is very low efficiency to search all users in a whole map. A solution is to divide a map into a number of small blocks with same size. Each small block manages a user list in the small block. When a user moves from one small block to another small block, the user should be deleted in the user list of an original small block and then be added into the user list of a new small block.

A group of other users (i.e., a visual field list of a user) that this user can see is greatly related to a location of this user. When this user moves, the group of other users around him changes accordingly. It should search the visual field again at appropriate time. In order to control granularity of the visual field search and set timing of the visual field search, a map can be divided into a number of same-sized search grids which is similar to map block management. For example, a 1024 meters×1024 meters map is divided into 4096 16 meters×16 meters grids, and when the user moves across a 16 meters×16 meters search grid, the visual field needs to be searched again.

Size of the search grid determines a search frequency and also influences a CPU performance load of the server at certain degree. If the search grid is too small, the search frequency is very high when the user moves. This can improve user experience but increases computing burden of the server. On the contrary, if the search grid is too big, the visual field changes slowly when the user moves. This can reduce burden of the server, but may influence the user experience. When searching the visual field, the user only searches nine small blocks (a 3×3 grid) around. When the user moves across the small block, three small blocks exit the 3×3 grid and meanwhile three new small blocks enter the 3×3 grid. It should search the visual field again at this time. Therefore, maximum size of the search grid should not be larger than that of the small block. In the embodiment, size of the search grid is equal to that of the small block. This can reduce burden of the server while not influencing the user experience.

It might still have a number of users in the 3×3 grid range. If let a user see all users in the 3×3 grid, he needs to receive all state change information of these users. The visual field has symmetry, and all users in the 3×3 grid range can see this user. The state change information of this user needs to be broadcast to all users in the 3×3 grid range. This broadcast message of mutually notifying state change can cause large pressures of CPU and data flow.

In order to control burden of the server, a visual field list of a user is a sub list of a user list in the 3×3 grid range. Obtaining process of the sub list is a visual field search process. When change of user state information causes a broadcast in a visual field range, if the visual field is searched again to broadcast, this causes a greater pressure of CPU because of frequent visual field search. Furthermore, change of the visual field list between two visual field searches is generally little. This results in a waste of computation.

In order to reduce number of visual field search, each user stores a search result when finishing the visual field search and maintains the visual field list that he stores. When broadcasting his state change, the user directly uses the visual field list that is stored. If the user moves a distance again, such as moving across the small block, then the user searches the field visual again and stores the search result again for broadcast use.

The visual field has symmetry. When a user A adds a user B into the visual field or deletes the user B from the visual field, meanwhile, the visual field of the user B is maintained to add/delete the user A.

Because there may be a number of users in the 3×3 grid range, each user only selects some users into his visual field list according to some rules. A method for selecting the visual field is a closeness-priority principle. But if distances between all users are ranked in the 3×3 grid, this will cost a lot of time of CPU. A following alternative method is that a number of distance levels are preset, all users are classified to different levels according to distances and users on the same level are treated equally. This avoids a global ranking in the 3×3 grid range and it only needs to collect the users into some distance queues. With the distance queues, the user can be selected in the visual field by priority according to the distances.

Figure 1:
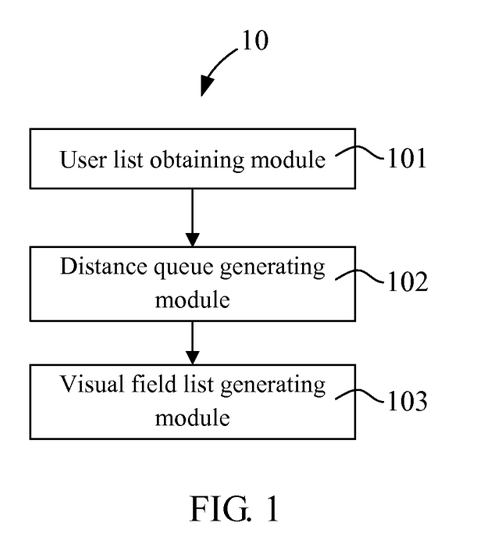
FIG. 1 is a block diagram of a map server according to an embodiment.

As shown in FIG. 1, a block diagram of a map server 10 according to an embodiment includes a user list obtaining module 101, a distance queue generating module 102 and a visual field list generating module 103.

The user list obtaining module 101 is configured to obtain a current-user-centered user list in a 3×3 grid.

The current user is that when a one-user-centered user list in the 3×3 grid is obtained, the one user is the current user.

The distance queue generating module 102 is configured to obtain distances between users and the current user in the user list, and to generate at least two distance queues corresponding to preset distance ranges according to the distances. The distance queue includes users in the user list whose distances from the current user are in a corresponding distance range.

The visual field list generating module 103 is configured to select a preset number of users from the distance queue into a visual field list according to a preset weight corresponding to the distance queue. The closer the distance range corresponding to the distance queue from the current user is, the higher the weight corresponding to the distance queue is.

For example, there are 6 distance queues. The weights are configured as 10:9:8:7:6:5 according to the distances from close to far/small to large. If a visual field upper limit is 200 persons, then quotas assigned to each distance queue are: 200×10/(10+9+8+7+6+5)=44, 200×9/(10+9+8+7+6+5)= 40, . . . , 200×5/(10+9+8+7+6+5)=22. Because it is a rounded-down operation, if there is a left quota after assigning the 200 quotas, then the left quota is added into the first distance queue.

The map server 10 classifies the users in the 3×3 grid into a number of distance queues using the preset distance ranges, selects some users into the visual field list according to a different weight of each distance queue, thereby reducing the pressure of the server. At this time, the current user can see more users around and there are users existing at some farther place. Under the circumstance of a large number of users crowding, the scene can be more real and the user experience can be improved.

When collecting the distance queues, because it only can collect one sub-grid after another sub-grid in the 3×3 grid, the users in the distance queue are queued according to position of the sub-grid. If the users in the front of the distance queue are simply selected into the visual field, the selected users are concentrated in the front sub-grids. In an embodiment, a user can be selected randomly from each distance queue.

Figure 2:
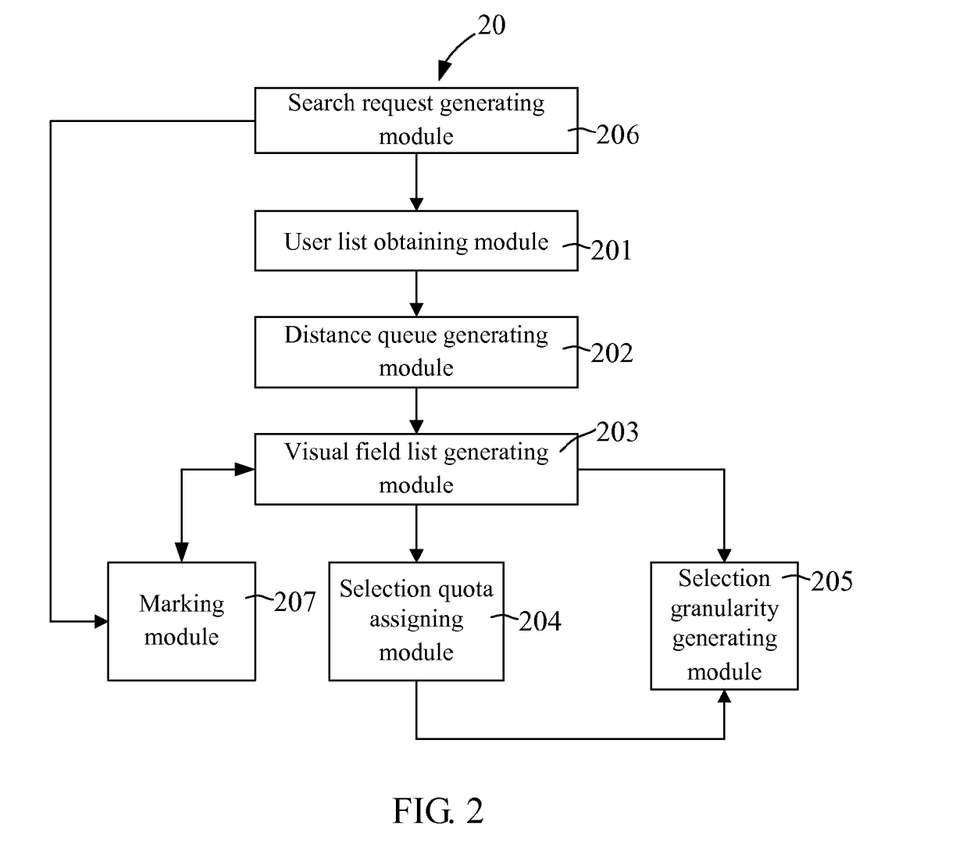
FIG. 2 is a block diagram of a map server according to another embodiment.

In order to better disperse the users and lower a computing burden of the server, as shown in FIG. 2, a block diagram of a map server 20 according to another embodiment includes a user list obtaining module 201, a distance queue generating module 202, a visual field list generating module 203, a selection quota assigning module 204, a selection granularity generating module 205, a marking module 207 and a search request generating module 206.

Differences between the map server 20 and the map server 10 are that:

The visual field list generating module 203 is further configured to select a user randomly in the distance queue, and to select users sequentially beginning from the randomly-selected user in the distance queue into the visual field list according to a preset selection granularity.

The reason for selecting a user randomly is that if all users in the 3×3 grid select from the same position, then a number of users select the same users into the visual field, and those that are not selected are all not selected. If all are selected randomly, then the computation amount is too much. Therefore, the present embodiment uses a first random selection, and selects the others sequentially in form of arithmetic progression. This not only ensures fairness of a user to be selected, but also does not bring too much computation pressure.

The selection quota assigning module 204 is configured to assign selection quotas corresponding to the distance queue according to the weight and a preset visual field upper limit.

The selection granularity generating module 205 is configured to generate the selection granularity according to the selection quotas and number of user in the distance queue. The selection granularity is a ratio of the number of user to the selection quotas.

The visual field list generating module 203 is configured to select users of the corresponding selection quotas sequentially beginning from the randomly-selected user in the distance queue into the visual field list according to the selection granularity.

For example, there are 180 persons in the first distance queue and the selection quotas are assigned to 44 persons, then the selection granularity is 180/44=4. If position of a first user that is selected randomly is at 2nd place, then position numbers of users that are selected in this distance queue are 2, 6, 10, 14, 18, . . . .

In an embodiment, the selection quota assigning module 204 is further configured to obtain an unassigned quota in the distance queue, and to add the unassigned quota into the selection quotas corresponding to other distance queues if number of the user in the distance queue is smaller than corresponding selection quotas.

The visual field list generating module 203 is further configured to, after selecting a preset number of users from all distance queues into the visual field list, if the number of user in the visual field list is smaller than a preset visual field upper limit, obtain remaining quotas which are differences between the preset visual field upper limit and the number of user in the visual field list, and to select an unselected user from the distance queue into the visual field list according to the remaining quotas until the remaining quotas are zero.

Selecting an unselected user into the visual field list can be a sequential selection and also can be a random selection and further can select a user from the unselected users from the distance queue into the visual field list according to the preset weight corresponding to the distance queue again. The search request generating module 206 is configured to obtain a map location where the current user locates, and to generate a visual field search request according to a preset search grid and the map location where the current user locates when the current user moves across a search grid.

Size of the search grid is smaller than or equal to that of a sub-grid in the 3×3 grid.

The user list obtaining module 201 responds to the visual field search request and obtains the current-user-centered user list in the 3×3 grid.

The marking module 207 is configured to respond to the visual field search request, to obtain a stored visual field list corresponding to the current user, and to mark a user in the stored visual field list.

The visual field list generating module 203 is further configured to obtain the user having a mark in the user list, and add the user having the mark into the visual field list corresponding to the current user.

Marking the user is because differences of user lists entering the visual field between two neighboring visual field searches are generally large. This can result in a number of users moving out of the visual field and a number of users entering the visual field in each visual field search. This can cause a great pressure of data flow. Visual field package content filling and packaging also bring a great pressure to CPU.

After the marking module 207 marks the user in the current visual field, the user is added into a new visual field list in priority in a next visual field search. This greatly reduces computation pressure of the server.

The marking module 207 is further configured to eliminate the mark of the user having the mark has after the visual field list generating module 203 generates the visual field list.

In an embodiment, the distance queue generating module 202 is further configured to select a preset number of users randomly from users in the user list whose distances from the current user are in a corresponding distance range into a corresponding distance queue.

This is because, when a user concentration is very high, there may be thousands of users crowding in the 3×3 grid range. Under this circumstance, each user collects all users in the 3×3 grid when doing the visual field search, and meanwhile, classifies these users into different distance queues. This also can cause a larger computation cost of CPU.

In fact, the maximum visual field upper limit of the user is generally up to 200 persons. It is a computation cost to over-collect 3×3-grid users. Therefore, the present embodiment collects part/preset number of users in the 3×3 grid randomly into the distance queue, such as 500 persons. This can reduce computation amount of the server greatly.

When the current user moves across a small block in the 3×3 grid, 6 small blocks are original and 3 new small blocks are added in a new 3×3 grid where the current user locates. In fact, the user more cares about users in the new 3 small blocks along a heading direction, and less cares about users in the original 6 visual field small blocks behind him. Therefore, in an embodiment, selection quotas that the selection quota assigning module 204 configures for the 3 new small blocks are larger than quotas of other small blocks except the small block where the current user locates.

Considering that the user more cares about users in a short distance and enough users in the short distance queue are selected into the visual field. Therefore, in an embodiment, the selection quotas that the selection quota assigning module 204 configures for the small block where the current user locates are larger than the selection quotas of other small blocks.

The present invention also provides a visual field controlling system including the map server 10/20 and a client interacting with the map server 10/20.

Figure 3:
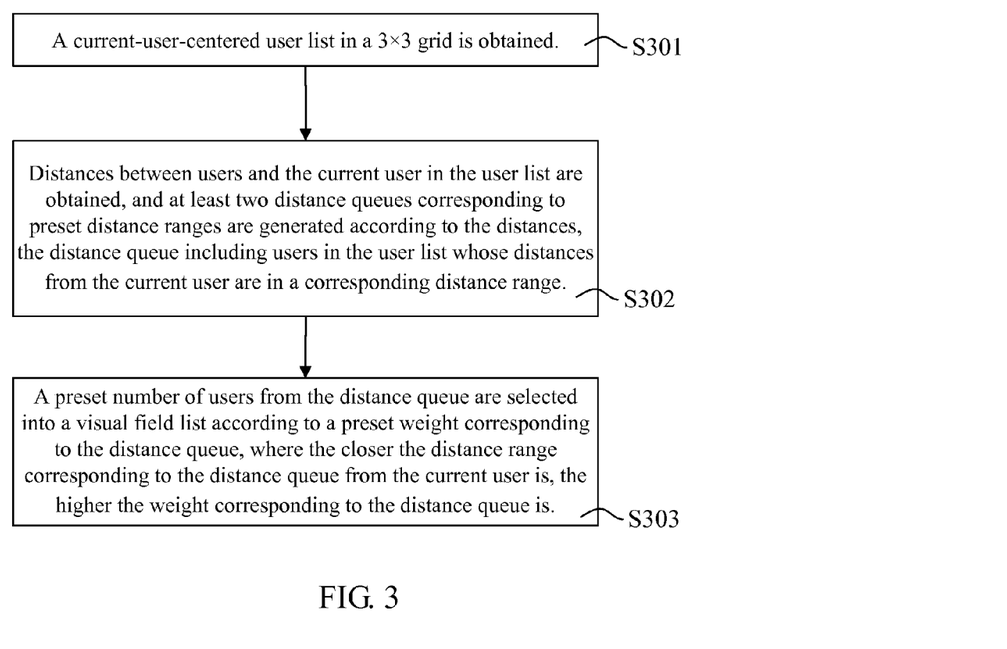
FIG. 3 is a flow diagram of a visual field controlling method according to an embodiment.

As shown in FIG. 3, a flow diagram of a visual field controlling method according to an embodiment is shown. The method includes the following steps:

Step S301, a current-user-centered user list in a 3×3 grid is obtained.

The 3×3 grid means that after the map is divided into a number of small blocks with same size, one small block and eight small blocks surrounding the one small block are called a 3×3 grid. Each small block has a list of user currently located in its range.

Step S302, distances between users and the current user in the user list are obtained, and at least two distance queues corresponding to preset distance ranges are generated according to the distances, the distance queue including users in the user list whose distances from the current user are in a corresponding distance range.

Step S303, a preset number of users from the distance queue are selected into a visual field list according to a preset weight corresponding to the distance queue, where the closer the distance range corresponding to the distance queue from the current user locates, the higher the weight corresponding to the distance queue is.

For example, there are 6 distance queues. The weights are given to 10:9:8:7:6:5 according to the distances from close to far/from small to large. If a visual field upper limit is 200 persons, then quotas assigned to each distance queue are: 200×10/(10+9+8+7+6+5)=44, 200×9/(10+9+8+7+6+5)=40, . . . , 200×5/(10+9+8+7+6+5)=22. Because it is a rounded-down operation, if there is a left quota after assigning the 200 quotas, then the left quota is added into the first distance queue.

The visual field controlling method classifies the users in the 3×3 grid into a number of distance queues using the preset distance ranges, selects some user visual field list according to a different weight of each distance queue, thereby reducing the pressure of the server. At this time, the current user can see more users around and there are users existing at some farther place. Under the circumstance of a large number of users crowding, the scene can be more real and the user experience can be improved.

When collecting the distance queues, because it only can collect one sub-grid after another sub-grid in the 3×3 grid, the users in the distance queue are queued according to position of the sub-grid. If the users in the front of the distance queue are simply selected into the visual field, the selected users are concentrated in the front sub-grids. In an embodiment, a user can be selected randomly from each distance queue.

In order to better disperse the users and lower a computing burden of the server, in an embodiment, the step S303 includes:

A user in the distance queue is randomly selecting, and users are selected sequentially beginning from the randomly-selected user from the distance queue into the visual field list according to a preset selection granularity.

The reason for selecting a user randomly is that if all users in the 3×3 grid select from the same position, then a number of users select the same users into the visual field, and those that are not selected are all not selected. If all are selected randomly, then the computation amount is too much. Therefore, the present embodiment uses a first random selection, and selects the others sequentially in form of arithmetic progression. This not only ensures fairness of a user to be selected, but also does not bring too much computation pressure.

In an embodiment, prior to the step S303, the method further includes the following steps:

Selection quotas corresponding to the distance queue are assigned according to the weight and a preset visual field upper limit.

The selection granularity is generated according to the selection quotas and number of user in the distance queue. The selection granularity is a ratio of number of user to the selection quotas.

The step of a preset number of users from the distance queues being selected into the visual field list according to the preset weight corresponding to the distance queues includes:

Users of the corresponding selection quotas are selected sequentially beginning from the randomly-selected user in the distance queue into the visual field list according to the selection granularity.

For example, there are 180 persons in the first distance queue and the selection quotas are assigned to 44 persons, then the selection granularity is 180/44≈4. If position of a first user that is selected randomly is at 2nd place, then position numbers of users that are selected in this distance queue are 2, 6, 10, 14, 18, . . . .

In an embodiment, the visual field controlling method further includes the following step:

An unassigned quota in the distance queue is obtained, and the unassigned quota is added into the selection quota corresponding to other distance queues if number of the user in the distance queue is smaller than corresponding selection quotas.

In an embodiment, the visual field controlling method further includes the following steps:

After selecting a preset number of users from all distance queues into the visual field list, remaining quotas are obtained if number of user in the visual field list is smaller than a preset visual field upper limit. The remaining quotas are differences between the preset visual field upper limit and the number of user in the visual field list.

An unselected user from the distance queue is selected into the visual field list according to the remaining quotas until the remaining quotas are zero.

An unselected user being selected into the visual field list can be a sequential selection and also can be a random selection and further can select a user from the unselected users from the distance queue into the visual field list according to the preset weight corresponding to the distance queue again.

In an embodiment, the visual field controlling method further includes the following step:

A map location where the current user locates is obtained, and a visual field search request is generated according to a preset search grid and the map location where the current user locates when the current user moves across a search grid.

Size of the search grid is smaller than or equal to that of a sub-grid of the 3×3 grid.

Execution of the step S301 is responsive to the visual field search request.

In an embodiment, the visual field controlling method further includes the following steps:

A stored visual field list corresponding to the current user is obtained in response to the visual field search request, and a user in the stored visual field list is marked.

After the step S301, the method further includes:

The user having a mark in the user list is obtained, and the user having the mark is added into the visual field list corresponding to the current user.

The mark of the user in the visual field list is eliminated.

Marking the user is because differences of user lists entering the visual field between two neighboring visual field searches are generally big. This can result in a number of users moving out of the visual field and a number of users entering the visual field in each visual field search. This can cause a great pressure of data flow. Visual field package content filling and packaging also bring a great pressure to CPU.

After the user is marked in the current visual field, the user is added into a new visual field list in priority in next visual field search. This greatly reduces computation pressure of the server.

In an embodiment, the visual field controlling method further includes the following steps:

A preset number of users in users in the user list whose distance from the current user is in a corresponding distance range are selected randomly into a corresponding distance queue.

This is because, when a user concentration is very high, there may be thousands of users crowding in the 3×3 grid range. Under this circumstance, each user collects all users in the 3×3 grid when doing the visual field search, and meanwhile, classifies these users into different distance queues. This also can cause a larger computation cost of CPU.

In fact, the maximum visual field upper limit of the user is generally up to 200 persons. It is a computation cost to over-collect 3×3-grid users. Therefore, the present embodiment collects part/preset number of users in the 3×3 grid randomly into the distance queue, such as 500 persons. This can greatly reduce computation amount of the server.

When the user moves across a small block, 6 small blocks are original and 3 new small blocks are added in the 3×3 grid where the user locates. In fact, the user more cares about users in the new 3 small blocks along a heading direction, and less cares about users in the original 6 small blocks behind him.

Therefore, in an embodiment, prior to the step S303, the method includes:

New small blocks of a current 3×3 grid with respect to an original 3×3 grid are obtained.

Selection quotas are assigned to each small block in the current 3×3 grid. The selection quotas of the new small block are larger than those of other small blocks except the small block where the current user locates.

The step S303 includes selecting a preset number of users from the distance queue into a visual field list according to a preset weight corresponding to the distance queue and the selection quotas of each small block.

Figure 4:
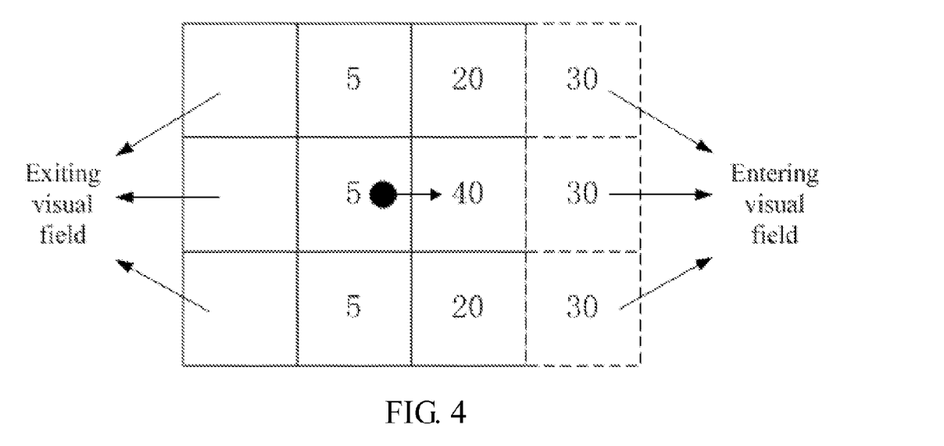
FIG. 4 is a schematic view showing change of a 3×3 grid and a quota configuration when a user moves across a block.

As shown in FIG. 4, quotas assigned to each small block of the new 3 blocks are 30, i.e., each small block of the 3 blocks along the heading direction of the user is assigned to 30 quotas. Quotas assigned to each block of 3 small blocks behind him are only 5.

In another aspect, considering that the user more cares about users in a short distance and it has to ensure that there are enough users in the short distance queue being selected into the visual field, therefore, in an embodiment, the selection quotas of the small block where the current user locates are larger than the selection quotas of other small blocks. As shown in FIG. 4, the selection quotas assigned to the small block where the current user locates are 40, which are larger than the selection quotas of any small block around.

In addition, the present invention also provides one or more computer storage medium including store computer-executable instructions. The computer-executable instructions are used for executing a visual field controlling method. Specific steps of the visual field controlling method that the computer-executable instructions in the computer storage medium execute are described by the above method, and detailed descriptions are omitted here.

The map server, the visual field controlling method and system, the computer storage medium can be applied in application programs such as mobile-terminal-map-based SNS information searching/sharing applications and also can be applied in a map server of a network game.

The above described embodiments explains only several exemplary embodiments of the present invention; the descriptions are specified and detailed, while shall not be understood as to limit the invention to the precise forms disclosed. It shall be mentioned that for those skilled in the art, alternative embodiments could be made to which the present invention pertains without departing from its spirit and scope. Accordingly, the scope of the present invention is defined by the appended claims.

What is claimed is:

1. A map server, comprising:
   a non-transitory storage medium storing computer executable instructions executable by at least one processor, wherein the computer executable instructions comprise:
   a search request generating module configured to obtain a map location where a current user locates and to generate a visual field search request according to a preset search grid and the map location where the current user locates when the current user moves across a search grid;
   a user list obtaining module configured to obtain a first user list in a 3×3 grid with the current user in the center of the 3×3 grid in response to the visual field search request:
   a distance queue generating module configured to obtain distances between users and the current user in the first user list in a map scene of a map-based application in the map server and to generate at least two distance queues corresponding to preset distance ranges according to the distances, one of the distance queues being a second user list comprising users in the first user list whose distances from the current user are in a corresponding distance range;
   a selection quota assigning module configured to assign selection quotas corresponding to the distance queues according to a preset weight and a preset visual field upper limit, wherein selection quotas for sub-grids along a heading direction of the current user is larger than selection quotas of other sub-grids except the sub-grid where the current user locates;
   a visual field list generating module configured to select a preset number of users from the distance queues into a visual field list according to the preset weight corresponding to the distance queues and a selection granularity, wherein the closer the distance range corresponding to the distance queues from the current user is, the higher the preset weight corresponding to the distance queues is and the selection granularity is a ratio of number of users in the one of the distance queues to the selection quotas, wherein the visual field list is a third user list for users that are in a visual field of the current user in the map-based application, and wherein the visual field list generating module is further configured to select a user randomly in the distance queues, and to select users sequentially beginning from the randomly-selected user in the distance queues into the visual field list according to the selection granularity;

a marking module configured, in response to the visual field search request, to obtain a stored visual field list corresponding to the current user and to mark a user in the stored visual field list, wherein the visual field list generating module is further configured to obtain the user having a mark in the first user list and add the user having the mark into the visual field list corresponding to the current user, and wherein the marking module is further configured to eliminate the mark of the user having the mark after the visual field list generating module generates the visual field list; and wherein the map server broadcasts state change information of the current user to the third user list of users that are in the visual field of the current user in the map-based application.

2. The map server of claim 1, wherein the selection granularity generating module is configured to generate the selection granularity according to the selection quotas and the number of users in the one of the distance queues; and wherein the visual field list generating module is further configured to select users of the corresponding selection quotas sequentially beginning from the randomly-selected user in the distance queues into the visual field list according to the selection granularity.

3. The map server of claim 2, wherein the selection quota assigning module is further configured to obtain an unassigned quota in the one of the distance queues and to add the unassigned quota into selection quotas of other distance queues if the number of the user in the one of the distance queues is smaller than corresponding selection quotas.

4. The map server of claim 1, wherein the visual field list generating module is further configured to, after selecting a preset number of users from all distance queues into the visual field list, if number of users in the visual field list is smaller than the preset visual field upper limit, obtain remaining quotas, which are differences between the preset visual field upper limit and the number of users in the visual field list, and to select an unselected user from the distance queues into the visual field list according to the remaining quotas until the remaining quotas are zero.

5. The map server of claim 1, wherein size of the search grid is smaller than or equal to that of a sub-grid in the 3×3 grid.

6. The map server of claim 1, wherein the distance queue generating module is further configured to select the preset number of users randomly from users in the distance queues whose distances from the current user are in the corresponding distance range into a corresponding distance queue.

7. A visual field controlling method, comprising the following steps:

obtaining, executed by a processor, a map location where a current user locates;

generating, executed by the processor, a visual field search request according to a preset search grid and the map location where the current user locates when the current user moves across a search grid, wherein generating the visual field search request further comprises obtaining a stored visual field list corresponding to the current user in response to the visual field search request and marking a user in the stored visual field list;

obtaining, executed by the processor, a first user list in a 3×3 grid with the current user in the center of the 3×3 grid in response to the visual field search field, wherein after the step of obtaining the first user list in the 3×3 grid further comprises obtaining a user having a mark in the first user list and adding the user having the mark into the visual field list corresponding to the current user;

obtaining, executed by the processor, distances between users and the current user in the first user list in a map scene of a map-based application in a map server;

generating, executed by the processor, at least two distance queues corresponding to preset distance ranges according to the distances, one of the distance queues being a second user list comprising users in the first user list whose distances from the current user are in a corresponding distance range;

assigning, executed by the processor, selection quotas corresponding to the distance queues according to a preset weight and a preset visual field upper limit, wherein selection quotas for sub-grids along a heading direction of the current user is larger than selection quotas of other sub-grids except the sub-grid where the current user locates;

selecting, executed by the processor, a preset number of users from the distance queues into the visual field list according to the preset weight corresponding to the distance queues and a selection granularity, wherein the closer the distance range corresponding to the distance queues from the current user is, the higher the preset weight corresponding to the distance queues is and the selection granularity is a ratio of number of users in the one of the distance queues to the selection quotas, and wherein the visual field list is a third user list for users that are in a visual field of the current user in the map-based application, and wherein selecting a preset number of users from the distance queues into the visual field list according to the preset weight corresponding to the distance queues further comprises selecting a user randomly in the distance queues and selecting users sequentially beginning from the randomly-selected user in the distance queues into the visual field list according to the preset selection granularity;

eliminating the mark of the user in the visual field list after selecting a preset number of users from the distance queues into the visual field list according to the preset weight corresponding to the distance queues; and broadcasting, executed by the map server, state change information of the current user to the third user list of users that are in the visual field of the current user in the map-based application.

8. The visual field controlling method of claim 7, wherein prior to the step of selecting a preset number of users from the distance queues into the visual field list according to the preset weight corresponding to the distance queues, the method further comprises: generating the selection granularity according to the selection quotas and the number of users in the one of the distance queues; and the step of selecting a preset number of users from the distance queues into the visual field list according to the preset weight corresponding to the distance queues comprises: selecting users of the corresponding selection quotas sequentially beginning from the randomly-selected user in the distance queues into the visual field list according to the selection granularity.

9. The visual field controlling method of claim 7, further comprising: obtaining an unassigned quota in the one of the distance queues and adding the unassigned quota into the selection quotas corresponding to other distance queues if the number of the users in the one of the distance queues is smaller than corresponding selection quotas.

10. The visual field controlling method of claim 7, further comprising: after selecting a preset number of users from all distance queues into the visual field list, obtaining remaining quotas which are differences between the preset visual field upper limit and the number of users in the visual field list if the number of users in the visual field list is smaller than the preset visual field upper limit; and
selecting an unselected user from the distance queues into the visual field list according to the remaining quotas until the remaining quotas are zero.

11. The visual field controlling method of claim 7, further comprising: wherein size of the search grid is smaller than or equal to that of a sub-grid in the 3×3 grid.

12. The visual field controlling method of claim 7, further comprising: selecting the preset number of users randomly from users in the first user list whose distances from the current user are in the corresponding distance range into a corresponding distance queue.

13. The visual field controlling method of claim 7, further comprising: obtaining new small blocks of a current 3×3 grid with respect to an original 3×3 grid;
assigning selection quotas for each small block in the current 3×3 grid, wherein the selection quotas of the new small block are larger than those of other small blocks except a small block where the current user locates; and
the step of selecting a preset number of users from the distance queues into the visual field list according to the preset weight corresponding to the distance queues comprising: selecting a preset number of users from the distance queues into a visual field list according to the preset weight corresponding to the distance queues and the selection quotas of each small block.

14. A non-transitory computer storage medium used to store computer-executable instructions, the computer-executable instructions used for implementing a visual field controlling method, wherein the method, executed by a processor, comprises the following steps:
obtaining a map location where a current user locates;
generating a visual field search request according to a preset search grid and the map location where the current user locates when the current user moves across a search grid, wherein generating the visual field search request further comprises obtaining a stored visual field list corresponding to the current user in response to the visual field search request and marking a user in the stored visual field list;
obtaining a first user list in a 3×3 grid with the current user in the center of the 3×3 grid in response to the visual field search field, wherein after the step of obtaining the first user list in the 3×3 grid further comprises obtaining a user having a mark in the first user list and adding the user having the mark into the visual field list corresponding to the current user;
obtaining distances between users and the current user in the first user list in a map scene of a map-based application in a map server;
generating at least two distance queues corresponding to preset distance ranges according to the distances, one of the distance queues being a second user list comprising users in the first user list whose distances from the current user are in a corresponding distance range;
assigning selection quotas corresponding to the distance queues according to a preset weight and a preset visual field upper limit, wherein selection quotas for sub-grids along a heading direction of the current user is larger than selection quotas of other sub-grids except the sub-grid where the current user locates;
selecting a preset number of users from the distance queues into a visual field list according to the preset weight corresponding to the distance queues, wherein the closer the distance range corresponding to the distance queues from the current user is, the higher the preset weight corresponding to the distance queues is and the selection granularity is a ratio of number of users in the one of the distance queues to the selection quotas, and wherein the visual field list is a third user list for users that are in a visual field of the current user in the map-based application, and wherein selecting a preset number of users from the distance queues into the visual field list according to the preset weight corresponding to the distance queues further comprises selecting a user randomly in the distance queues and selecting users sequentially beginning from the randomly-selected user in the distance queues into the visual field list according to the preset selection granularity;
eliminating the mark of the user in the visual field list after selecting a preset number of users from the distance queues into the visual field list according to the preset weight corresponding to the distance queues; and
broadcasting, executed by the map server, state change information of the current user to the third user list of users that are in the visual field of the current user in the map-based application.

* * * * *